United States Patent Office 3,799,846
Patented Mar. 26, 1974

3,799,846
MOISTURE ANALYSIS METHOD
Italo A. Capuano, Orange, Conn., assignor to
Olin Corporation
Continuation-in-part of abandoned application Ser. No. 59,886, July 31, 1970. This application June 9, 1972, Ser. No. 261,244
Int. Cl. G01n 27/46
U.S. Cl. 204—1 T          5 Claims

ABSTRACT OF THE DISCLOSURE

The moisture content of fluids is determined, using electrodes separated by a film of suitable hydroscopic substance, by passing the aeriform fluid over a limited area of film at such a rate that only a small part of the moisture is removed by the hydroscopic substance. Simultaneously, the water absorbed by the hygroscopic substance is electrolyzed by passage of direct current between the electrodes. At extremely rapid rates of flow of the fluid, a steady state is rapidly established and the flow of current used in the electrolysis is directly proportional to the concentration of water contained in the fluid. As a result, the measurement of the amperage accurately measures the water content in the fluid. The method is simpler, faster and more accurate than prior art methods depending on coulometric measurement of the total water contained in the sample.

---

Figure 1:
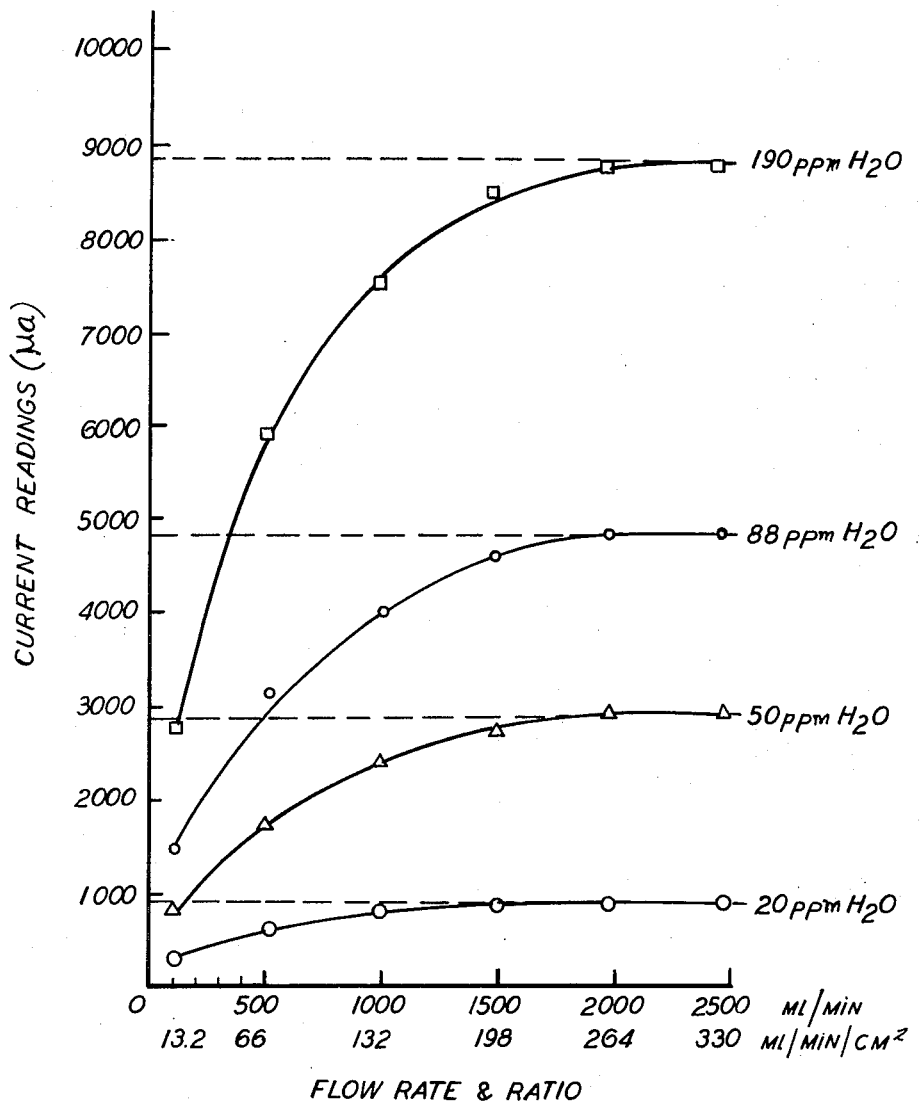

This application is a continuation-in-part of co-pending Ser. No. 59,886, filed July 31, 1970, now abandoned.

This invention relates to a method for determining the water concentration in a fluid by absorbing moisture from the aeriform fluid in a hygroscopic agent and electrolyzing the absorbed water. More particularly, the invention relates to improvements in such determinations, in which a steady state is established between the moisture absorbed in the hygroscopic agent and the water concentration in the fluid and therefore the electrolyzing current is also proportional to the water concentration in the fluid.

Methods and devices for the determination of water content of fluids are well known. British Pat. 704,552 discloses using electrodes covered with a film of a difficulty soluble salt, e.g., aluminum fluoride, which absorbs moisture and changes in conductivity and resistance. Alternating current applied to the electrodes avoids electrolysis and its flow is proportional to the amount of water absorbed. Sensitivity of this device is too low to be satisfactory, especially when moisture is present in the fluid only in parts per million.

U.S. Pat. No. 2,830,945, issued Apr. 15, 1958 to Keidel discloses a device for determination of water content of a fluid. The Keidel device and method is further described in "Analytical Chemistry," vol. 31, pages 2043–8 (December 1959). In the Keidel device, the fluid containing water is passed over a hygroscopic agent. All of the moisture is absorbed by the hygroscopic agent and the fluid is dried as it passes through the device. This device contains two electrodes in contact with the hydroscopic agent but separated from each other. An electrical potential is applied to these two electrodes and the absorbed moisture is electrolyzed to elemental hydrogen and oxygen, regenerating the hygroscopic agent. Keidel uses an electrolytic element having a diameter of 0.05 inch and a length of 2 feet. (See the December 1959 publication, page 2044, left column and Figure 1). The area of $P_2O_5$ coating is $2\pi rh$ where $r$ is the radius and $h$ is the height of the cylinder; $2\times3.14\times0.0635$ cm.$\times60.9$ cm.$=24.43$ cm.$^2$. Using a flow rate of 100 ml./min., as described, the ratio of the flow rate to the area of $P_2O_5$ is $100/24.43=4.09$ ml./min./cm.$^2$ $P_2O_5$.

According to Faraday's laws of electrolysis, the total coulombs of electrical current which flow between the two electrodes during electrolysis are directly proportional to the total amount of water absorbed and decomposed. The amount of water decomposed by electrolysis is calculated coulometrically. Knowing the volume of fluid passing through the device, the percentage of water in the fluid is determined.

One limitation of the Keidel and other coulometric devices is that the principle of their operation requires that the entire moisture content of the fluid must be absorbed by the hydroscopic agent. Devices of convenient size become saturated with moisture at comparatively low moisture levels, do not absorb all the moisture from the fluid and therefore do not accurately measure the true water content of the fluid, particularly when the moisture content is high.

An improvement in the Keidel device is presented in U.S. Pat. 3,001,918 issued Sept. 25, 1961 to Czuha whereby fluids of higher moisture content can be analyzed. The Czuha device and method is further described in "Analytical Chemistry," vol. 31, pages 2048–50 (December 1959). In the Czuha invention, a moisture-permeable diffusion barrier is provided between the moisture-containing fluid and the hydroscopic agent. Some of the moisture diffuses through the barrier and is absorbed by the hydroscopic agent as rapidly as it passes through the diffusion barrier. The limiting factor for the rate of absorption of moisture is the mass transfer rate of the moisture through the barrier, rather than the absorption capacity of the hygroscopic agent. The device of Czuha is much smaller than that of Keidel for the same capacity, since only a portion of the total moisture of the substance is absorbed. For general use in the measurement of the moisture content of fluids, it has been found that the diffusion barrier is unnecessary and undesirable.

In Keidel, all of the moisture must be absorbed in the hydroscopic agent and must be quantitatively electrolyzed in order to determine the amount of moisture in the fluid. This measurement is coulometric and depends on Faraday's law that each Faraday or 96,500 coulombs of electricity decomposes one gram equivalent weight of the material. One coulomb is the amount of electricity transferred in one second by one ampere and both the time of the electrolysis and the amperes must be measured for the coulometric determination. In addition, the rate of flow of the fluid must be accurately measured and constantly maintained.

In contrast to coulometric measurements, the method of the present invention eliminates the time factor in the electrolysis by maintaining steady state conditions and depending on the principles of mass transfer. As long as the moisture content of the fluid remains constant, the time required for the measurement remains constant and can be disregarded. Then the moisture content of the fluid becomes proportional to the amperes flowing. When the moisture content of the fluid charges, a new steady state is quicky established and the amperes flowing again measure the moisture content of the fluid. The method of the present invention is essentially an amperometric method as contrasted with coulometric methods.

An electrolysis hygrometer is described in Bedrijf en Techniek, vol. 21, No. 512, Apr. 26, 1966, page 673 in which 2 to 20 liters per minute of gas is passed through. Part of the water in the gas sample is absorbed and electrolyzed until a steady state results between the absorbed and electrolyzed water. The current required measures the moisture content of the gas. No further details are disclosed as to how these operations are carried out.

The process of the present invention avoids all the disadvantages of the prior art methods and is simpler, faster, more direct and more accurate than other prior art methods. It is more quickly responsive to changes in moisture content of a flowing stream of fluid.

According to the method of the present invention, the moisture-containing fluid is passed in contact with a film of hygroscopic agent which is substantially non-conductive electrically and non-reactive with said fluid but reactive with water to form an electrically conductive substance, in turn decomposable electrolytically into the elements of water and to regenerate said hygroscopic agent, said film of hygroscopic substance being in contact with chemically inert electrodes having a water-electrolyzing direct current electrical potential applied thereto, the rate of flow of said fluid stream exceeding that at which all the moisture in said fluid stream is absorbed by said hygroscopic agent and being sufficient that further increments in rate fail to increase the quantity of moisture absorbed from the fluid and measuring amperometrically the electrical flow between said electrodes, whereby said electrical flow is directly proportional to the moisture content of said fluid stream.

The process of the present invention uses a ratio of flow rate, in ml./min./per cm.$^2$ of surface of the hydroscopic substance exposed to the moisture-containing fluid, of at least 250/1. Above this ratio, it has been discovered and demonstrated that (1) only a minor fraction of the moisture in the fluid is absorbed; (2) higher ratios do not significantly change the percentage of moisture removed from the gas; and (3) above the stated minimum ratio, the same analytical results are obtained even though the ratio varies. The method of this invention, therefore, requires no precise control of flow rate as in prior art methods; it is more accurate and faster and the apparatus is simpler and less expensive than provided in the prior art.

In the method of this invention, the transfer of moisture is diffusion controlled from the fluid to the hygroscopic substance between the electrodes. The driving force is substantially proportional to varying moisture concentrations. A steady state is rapidly established and the electrolysis current is measured amperometrically. Within desired analytical accuracy, this steady state value is (1) not affected by further increases in the ratio and is (2) quickly responsive to changes in moisture content.

Figure 2:
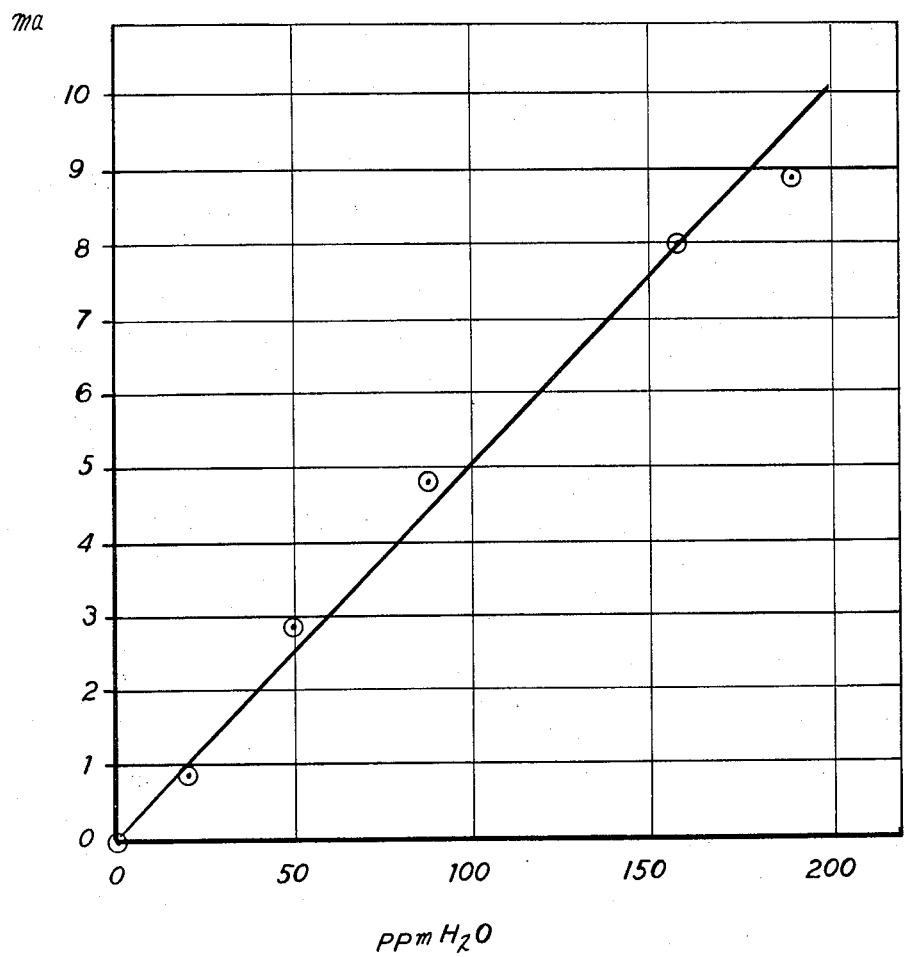
Figure 3:
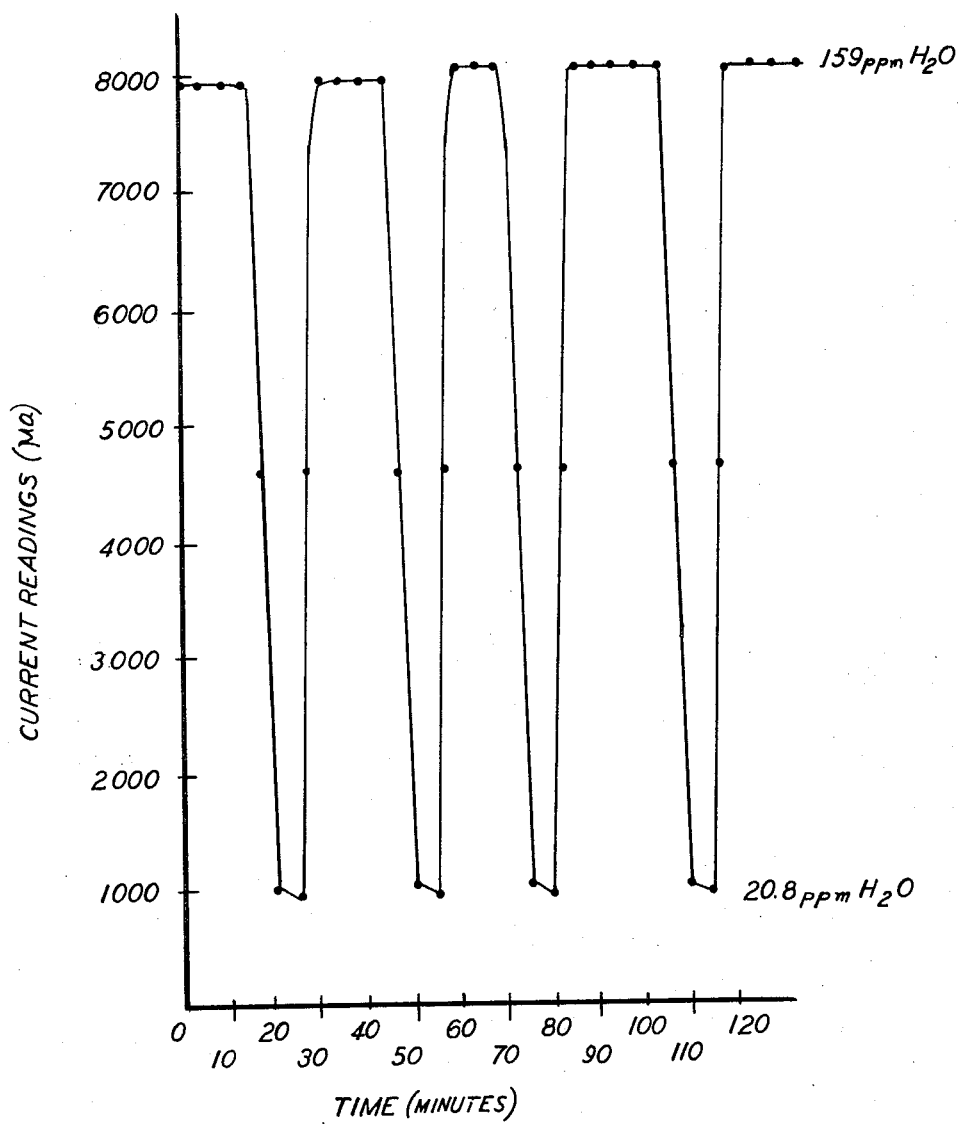

The figures herewith illustrate the invention. FIG. 1 is a graph showing the results obtained in Example I. FIG. 2 is a graph based on the same data showing that the moisture content and the microammeter readings are directly proportional. FIG. 3 is a graph showing the results of Example II.

Each point in FIG. 1 is a determination of the microammeter reading at various flow rates for various moisture contents of chlorine gas in a cell having an effective area of $P_2O_5$ of 7.58 cm.$^2$. Each curve shows that at ratios below 250 ml./min./cm.$^2$ of $P_2O_5$ the microammeter reading is not an accurate measure of the moisture content unless the flow rate is maintained absolutely constant. This is the basis for the requirement in coulometric systems for absorbing all the moisture in a known quantity of sample. However, at ratios of 250 ml./min./cm.$^2$ and higher, each curve levels off and a steady state is quickly established. Higher ratios produce no higher microammeter reading. The system is then in a steady state. For each moisture content, the steady state microammeter value is determined by a broken horizontal line extrapolated from the horizontal portion of the curve to the vertical or y-axis. Exemplary steady state microammeter readings are shown in Table I.

TABLE I

Current Readings vs. $H_2O$ Content
Steady state

| Microamperes: | $H_2O$, p.p.m. |
|---|---|
| 800 | 20 |
| 2800 | 50 |
| 4800 | 88 |
| 8900 | 190 |

These results are shown graphically in FIG. 1.

The data of FIG. 1 were obtained as described in Example I, using a $P_2O_5$ surface in the form of a cylinder 1 inch in length and 0.375 inch in diameter. The $P_2O_5$ surface was $2\pi rh$ where $r$ is the radius and $h$ is the length or height of the cylinder. The $P_2O_5$ surface amounted to 7.58 cm.$^2$. The ratios of the several flow rates shown in FIG. 1 to the $P_2O_5$ area are given in Table II.

TABLE II

Ratio of Flow Rate to $P_2O_5$ Area

| Flow rate, ml./min.: | Ratio, ml./min./ cm.$^2$ $P_2O_5$ |
|---|---|
| 2500 | 330 |
| 2000 | 264 |
| 1500 | 198 |
| 1000 | 132 |
| 500 | 66 |
| 100 | 13.2 |

In contrast to the ratio of 264/1 shown in Table II at a flow rate of 2000 ml./min., the ratio of 4.09/1 used by Keidel shows that his operation was (1) along the vertical or y-axis of FIG. 1 and (2) at such a low ratio the rate of flow must be maintained constant and all the water must be absorbed and electrolyzed to obtain significant analytical results.

Table II shows that at a flow rate of 2000 ml./min. in the particular apparatus used corresponds to a ratio of 264 ml./min./cm.$^2$ of surface of hygroscopic agent exposed to the fluid. Hence, the method of the invention is characterized by a ratio of about 250 or higher to provide the desired steady state and to produce accurate analytical results.

Table III shows that significant proportions of the water introduced are removed from the fluid at ratios below about 250/1 but not above that ratio. Table III shows the parts of water remaining in the fluid after analysis and shows that at ratios above 250/1 very little of the water is removed from the fluid being analyzed.

TABLE III.—WATER REMAINING IN GAS AT VARIOUS RATES

| $H_2O$ in gas, p.p.m. | Ratio, ml./mim./cm.$^2$ | | | | | |
|---|---|---|---|---|---|---|
| | 13.2 | 66 | 132 | 198 | 264 | 330 |
| 20 | 15.11 | 17.94 | 18.59 | 19.02 | 19.19 | 19.39 |
| 50 | 35.33 | 44.13 | 45.76 | 46.81 | 47.45 | 47.96 |
| 88 | 61.92 | 76.92 | 80.94 | 82.60 | 83.74 | 84.59 |
| 190 | 141.11 | 169.14 | 176.69 | 180.00 | 182.23 | 183.76 |

In Table IV the values of Table III are converted to the corresponding percentages of the water content remaining in the fluid after analysis.

TABLE IV.—PERCENT OF WATER CONTENT REMAINING

| $H_2O$ in gas, p.p.m. | Ratio, ml./mim./cm.$^2$ | | | | | |
|---|---|---|---|---|---|---|
| | 13.2 | 66 | 132 | 198 | 264 | 330 |
| 20 | 75.6 | 89.7 | 92.9 | 95.1 | 95.9 | 97.0 |
| 50 | 70.7 | 88.3 | 91.6 | 93.6 | 95.0 | 95.9 |
| 88 | 70.4 | 87.4 | 92.0 | 93.9 | 95.2 | 96.1 |
| 190 | 74.3 | 89.0 | 93.0 | 94.7 | 95.9 | 96.7 |

The data of Table IV show that at ratios above 250/1, there is no significant increase in the amount of water removed and a sufficiently steady state has been established that higher ratios produce no significantly different analytical results.

In contrast, at ratios below 250/1, changes in the rate materially change the amount of water absorbed. No significant analytical results can be obtained in this range unless the rate is maintained constant because the rate of absorption for a given concentration is not independent of flow.

FIG. 2 is constructed from FIG. 1 showing the strictly proportional relation between the microammeter reading at equilibrium and the moisture content. FIG. 2 is thus a graph from which the moisture content of the fluid can be read, knowing the microammeter reading. Since the relationship is strictly proportional, the microammeter is suitably calibrated on the basis of the equilibrium values of microamperes at constant water contents to read directly in parts per mililon of water in the fluid.

Since the method of this invention does not depend on absorption of all the moisture in a sample of fluid, a very much smaller electrode than required for coulometric methods is suitable. Electrodes useful in the method of the present invention are constructed similarly to those of the prior art with the exception that they are much smaller. For example, 20 inches of fine platinum wire for each electrode in a pair is sufficient. In contrast, Taylor, Refrigerating Engineering 64, 41–47 and 87 (1956), uses a 33 inch cylinder 0.020 inch in diameter wound with 0.005 inch diameter platinum wires spaced 0.005 inch apart. This requires 415 inches of 0.005 inch diameter platinum wire or 4 grams of platinum. At $140 per troy ounce, this electrode contains $18.00 worth of platinum. An electrode suitable for the present invention, however is made of 40 inches of 0.01 inch diameter platinum wire having a present market value of only about $5.00.

Platinum electrodes are preferable but also suitable are any of the platinum group metals or their alloys.

A rod of suitable dielectric material, which with special advantage is polyethylene, is machined with double $\frac{1}{16}$ inch threads and wound with two 0.01 inch diameter platinum wires, $\frac{1}{32}$ inch apart. The rod is suitably 0.375 inch in diameter and 1.0 inch in length. Stainless steel connectors lead through a plug of polyethylene threaded to fit internal threads in the bore of a polyethylene block. The rods seats in the base of the bore in the block. Clearance between the electrodes and the bore walls is large, for example, 0.08 inch since complete absorption of the moisture is not necessary. The block is drilled from the side with inlets and outlets just above and below the ends of the platinum electrodes. The shorter length of the electrodes suitable for use in the method of this invention entirely avoids the problem in other methods of avoiding recombination of hydrogen and oxygen.

The preferred dielectric material on which the electrodes are wound is polyethylene which is an effective insulator and has good wettability by the aqueous phosphoric acid sensitizing solution. Other plastics, for example, polyvinyl chloride, polymethylmethacrylates and polystyrene are also suitable. The casing is suitably fabricated on the same plastics. Advantageously the cell block is transparent, permitting instant visual examination of the electrodes. These plastics, particularly for fabrication of the electrode-bearing rod, are preferable to glass, although glass can be used. Polyethylene particularly, and other plastics as well, which are more electrically conductive than glass are advantageous in promoting drying of the phosphoric acid film initially deposited on the electrodes. The flow of electrons through the plastic provides electrons which promotes the electrolysis of the water absorbed during analysis.

Suitable valves, pressure regulators and filters are provided in the fluid inlet lines. The filters are usually unnecessary and are only safeguards. In the method of this invention, the total absorption of the moisture content of the fluid being unnecessary, clearances are conveniently large. The system is not subject to clogging by dust, dirt, rust and other solid particles as are the prior art systems in which total absorption of the moisture is required and close clearances are essential to avoid by-passing and non-absorption of moisture.

Hygroscopic materials suitable for use in the method of the present invention are those which are conductive when wet, non-conductive when dry. Examples include phosphorus pentoxide, sodium hydroxide, potassium carbonate, potassium hydroxide, potassium metaphosphate and silicic acid, it being understood that the hygroscopic agent will be selected to be non-reactive with components of the fluid to be analyzed, except water. Phosphorus pentoxide is eminently suited for acid and neutral fluids, for example, air, nitrogen, oxygen, hydrogen, chlorine, hydrogen chloride, carbon dioxide, phosgene, aliphatic hydrocarbons including ethane and butane and halogen substituted aliphatic hydrocarbons including ethyl chloride and the Freons, e.g., dichlorodifluoromethane. Liquids are suitably vaporized before analysis. The caustic alkalies are particularly suitable hygroscopic agents for the moisture analysis of ammonia, hydrazine, methylamine and other bases.

EXAMPLE I

A polyethylene rod 0.375 inch in diameter and 1 inch in length was machined with double $\frac{1}{16}$ inch threads and wound with two 0.01 inch diameter platinum wire electrodes, $\frac{1}{32}$ inch apart. Each electrode was attached to stainless steel connectors extending through a cap which was threaded to fit internal threads in the bore of a polyethylene block. Clearance between the rod and the bore was 0.08 inch. Free cross-sectional area was 0.65 cm.$^2$. Stainless steel gas inlet and outlet ilnes were let into the block just above and below the end of the platinum electrodes.

The cell was prepared for use by immersing the electrodes in a 12.75 percent aqueous solution of phosphoric acid prepared by adding 15 ml. of 85 percent reagent grade phosphoric acid to 85 ml. of distilled water. The electrode was drained and dried under a heat lamp to evaporate the major portion of the water. The electrode was assembled in the cell bock and dry nitrogen was passed through the cell while 75 volts DC was applied to the electrodes. When the current indicated by a microammeter fell to zero, the cell was ready for use. This is the procedure substantially as described by Taylor, loc. cit. The microammeter in the 75 volt DC circuit is calibrated to read directly the moisture content of the fluid and a recorder is suitably wired to the microammeter.

Chlorine gas was passed through a gate valve, a pressure reducing controller, pressure indicator and a suitable filter into the inlet line of the electrolytic cell. The exit gas passed through a flow meter and out.

The cell and pressure regulators were enclosed in a thermostatically controlled, circulating air, constant temperature box maintained at any suitable temperature, for example, 40° C. since the measurements are temperature dependent.

Samples of chlorine gas containing varying amounts of moisture were passed through the cell at rates from 100 ot 250 ml./min. The data shown in FIG. 1 were obtained and FIG. 2 was constructed as described above. FIG. 2 serves as a graph for relating the microammeter readings to parts per million (p.p.m.) of water in the gas.

EXAMPLE II

The apparatus described in Example I was used to measure the moisture content in two samples of chlorine gas containing 159 and 20.8 p.p.m. of moisture. The chlorine gas flow through the system was maintained at 2000 ml./min. The two chlorine supplies were alternately passed into the analyzer for periods of 20 minutes each. The microammeter consistently showed 1000 and 8000 microammeters for the two samples with about one minute for the reading to change after each sample switch. The results are shown graphically in FIG. 3. This demonstrates the reproducibility and rapid response using the method of this invention.

EXAMPLE III

An analyzer was constructed suitable for plant installation. It consisted of two parallel inlet lines and two parallel outlet lines, regulators, filters and cells. One line was available for analyses while the other cell was re-coated with hygroscopic agent. The cell not in use was maintained in ready condition for use by passing dry nitrogen through it while maintaining the decomposition potential of 75 volts DC on the electrodes. In this manner, instrument downtime was eliminated.

The inlet gas was chlorine removed by a sample tap from a high pressure plant process line. The exit gas was returned to a low pressure plant process line.

The moisture content of the plant process chlorine was continuously monitored over an extended period. In a typical week, the data in Table V were recorded.

TABLE V

| Date | Moisture, p.p.m. | |
|---|---|---|
| | Minimum | Maximum |
| 13 | 4 | 7 |
| 14 | 2 | 6 |
| 15 | 4 | 9 |
| 16 | 4 | 7 |
| 17 | 3 | 6 |

EXAMPLE IV

The procedure and apparatus of Example III was connected to a plant line of flowing $CO_2$. The moisture content of the plant process $CO_2$ was continuously monitored over an extended period. Typical data were recorded within the same limits as shown in Table V.

EXAMPLE V

The procedure and apparatus of Example III was applied to a plant line containing nearly anhydrous hydrogen chloride gas. Essentially similar measurements were recorded.

EXAMPLE VI

Applying the procedure and apparatus of Example III to a plant line containing butane (mixed $C_4H_{10}$) also gives essentially similar measurements.

What is claimed is:

1. A method for determining moisture content of a fluid by contacting an aeriform stream of said fluid with a film of hygroscopic agent which is substantially non-conducting electrically and non-reactive with said fluid but reacts with water to form an electrically conducting substance, electrolytically decomposing said electrically conducting substance into the elements of water and regenerating said hygroscopic agent by contacting said film of hygroscopic substance with chemically inert electrodes having a water-electrolyzing direct current electrical potential applied thereto, while maintaining the ratio of the rate of flow of said fluid stream in ml./min. to the exposed area of said hygroscopic agent in cm.$^2$ to be at least 250/1, said hygroscopic agent absorbing less than 10 percent of the amount of said moisture in said fluid, and measuring amperometrically the electrical flow between said electrodes.

2. The method of claim 1 in which said electrodes are formed of a platinum group metal.

3. The method of claim 2 in which said metal is platinum.

4. The method of claim 1 in which had hygroscopic agent is selected from the group consisting of phosphorus pentoxide, sodium hydroxide, potassium hydroxide, potassium carbonate, potassium metaphosphate and silicic acid.

5. The method of claim 1 in which said fluid is selected from the group consisting of air, nitrogen, oxygen, hydrogen, chlorine, hydrogen chloride, phosgene, carbon dioxide, aliphatic hydrocarbons and halogen substituted aliphatic hydrocarbons.

References Cited

UNITED STATES PATENTS

| 3,337,441 | 8/1967 | Goldsmith | 204—195 W |
| 3,051,643 | 8/1962 | Bergson | 204—195 W |
| 3,001,918 | 6/1964 | Czuha et al. | 204—17 |

OTHER REFERENCES

"Bedrijf en Techniek," vol. 21, No. 512, Apr. 26, 1966, p. 673.

"Analytical Chemistry," vol. 31, No. 12, December 1959, pp. 2043-2048.

TA-HSUNG TUNG, Primary Examiner

U.S. Cl. X.R.

204—195 W